US012008836B2

United States Patent
Kim et al.

(10) Patent No.: US 12,008,836 B2
(45) Date of Patent: Jun. 11, 2024

(54) SPATIALLY AND TEMPORALLY DYNAMIC ILLUMINATION FOR FINGERPRINT AUTHENTICATION

(71) Applicant: Google LLC, Mountain View, CA (US)

(72) Inventors: Hyunchul Kim, San Jose, CA (US); Chien-Hui Wen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/313,138

(22) Filed: May 5, 2023

(65) Prior Publication Data
US 2023/0274573 A1    Aug. 31, 2023

Related U.S. Application Data

(60) Provisional application No. 63/500,114, filed on May 4, 2023.

(51) Int. Cl.
*G06V 40/13* (2022.01)
*G09G 3/3208* (2016.01)

(52) U.S. Cl.
CPC ....... *G06V 40/1318* (2022.01); *G09G 3/3208* (2013.01); *G09G 2320/0633* (2013.01); *G09G 2320/064* (2013.01)

(58) Field of Classification Search
None
See application file for complete search history.

(56) References Cited

U.S. PATENT DOCUMENTS

| 9,697,758 | B2 | 7/2017 | Watanabe et al. |
| 10,021,226 | B2 | 7/2018 | Gagne-Keats et al. |
| 10,068,551 | B1 | 9/2018 | Choi et al. |

(Continued)

FOREIGN PATENT DOCUMENTS

| CN | 101089713 A | 12/2007 |
| CN | 111241890 | 6/2020 |

(Continued)

OTHER PUBLICATIONS

"Foreign Office Action", EP Application No. 20765452.6, Jan. 16, 2024, 5 pages.

(Continued)

*Primary Examiner* — Joseph R Haley
(74) *Attorney, Agent, or Firm* — Colby Nipper PLLC (57) ABSTRACT

This document describes systems and techniques for spatially and temporally dynamic illumination for fingerprint authentication. In aspects, a method is disclosed that involves receiving user input at a display of an electronic device, initiating biometric authentication, and instructing a display-driver integrated circuit (DDIC) to implement a local high-brightness mode, which causes a predetermined portion of the display to increase in luminance to a target luminance for at least a first interval and a second interval. The DDIC is also instructed to cause a variable portion of the display to increase in luminance for the first interval and, at the expiration of the first interval, decrease luminance. During the first and/or second interval, an under-display fingerprint sensor captures one or more images. It is then determined, based on analysis of the one or more images, whether the user input is indicative of an authorized user.

10 Claims, 9 Drawing Sheets

(56) References Cited

U.S. PATENT DOCUMENTS

| | | | |
|---|---|---|---|
| 10,440,839 | B2 | 10/2019 | Cheng |
| 10,510,317 | B2 | 12/2019 | Spence et al. |
| 10,742,788 | B2 | 8/2020 | Shin et al. |
| 10,838,452 | B2 | 11/2020 | Siddiqui et al. |
| 10,890,954 | B2 | 1/2021 | Evans et al. |
| 11,163,970 | B1 | 11/2021 | Sammoura et al. |
| 11,403,984 | B2 | 8/2022 | Jung et al. |
| 2006/0093928 | A1 | 5/2006 | Hung et al. |
| 2007/0070272 | A1 | 3/2007 | Gettemy et al. |
| 2008/0123032 | A1 | 5/2008 | Taniguchi et al. |
| 2010/0053853 | A1 | 3/2010 | Allore et al. |
| 2011/0175852 | A1 | 7/2011 | Goertz et al. |
| 2013/0088671 | A1 | 4/2013 | Drzaic et al. |
| 2013/0342519 | A1 | 12/2013 | Kim et al. |
| 2014/0118985 | A1 | 5/2014 | Hassember |
| 2014/0240911 | A1 | 8/2014 | Cole et al. |
| 2014/0265822 | A1 | 9/2014 | Drzaic et al. |
| 2015/0070826 | A1 | 3/2015 | Montevirgen et al. |
| 2015/0138434 | A1 | 5/2015 | Chuang et al. |
| 2015/0287352 | A1 | 10/2015 | Watanabe et al. |
| 2015/0301417 | A1 | 10/2015 | Park et al. |
| 2015/0331292 | A1 | 11/2015 | Yang et al. |
| 2016/0063933 | A1 | 3/2016 | Kobayashi et al. |
| 2016/0078838 | A1 | 3/2016 | Huang et al. |
| 2016/0078846 | A1 | 3/2016 | Liu et al. |
| 2016/0227654 | A1 | 8/2016 | Kim et al. |
| 2016/0337570 | A1 | 11/2016 | Tan et al. |
| 2017/0092196 | A1 | 3/2017 | Gupta et al. |
| 2017/0116932 | A1 | 4/2017 | Musgrave et al. |
| 2017/0168463 | A1 | 6/2017 | Hong et al. |
| 2017/0200054 | A1 | 7/2017 | Du et al. |
| 2017/0322357 | A1 | 11/2017 | De Jong et al. |
| 2018/0012006 | A1 | 1/2018 | Suh et al. |
| 2018/0018501 | A1 | 1/2018 | Mather et al. |
| 2018/0040301 | A1 | 2/2018 | Bae et al. |
| 2018/0151109 | A1 | 5/2018 | Shim et al. |
| 2018/0165508 | A1 | 6/2018 | Othman et al. |
| 2018/0260602 | A1 | 9/2018 | He et al. |
| 2018/0285619 | A1 | 10/2018 | Kim et al. |
| 2018/0300526 | A1* | 10/2018 | Cho .................... G06F 21/32 |
| 2018/0301080 | A1 | 10/2018 | Shigeta et al. |
| 2019/0057660 | A1* | 2/2019 | Lee .................... G06F 21/32 |
| 2019/0197944 | A1* | 6/2019 | Kim .................. G06V 40/1318 |
| 2019/0228740 | A1 | 7/2019 | Aflatooni et al. |
| 2019/0303639 | A1 | 10/2019 | He et al. |
| 2019/0303642 | A1 | 10/2019 | He et al. |
| 2020/0035202 | A1 | 1/2020 | Aflatooni et al. |
| 2020/0050818 | A1 | 2/2020 | He et al. |
| 2020/0117933 | A1 | 4/2020 | Chang et al. |
| 2020/0273427 | A1 | 8/2020 | Wang |
| 2020/0327348 | A1 | 10/2020 | Kim |
| 2021/0056281 | A1 | 2/2021 | Shih et al. |
| 2021/0201731 | A1 | 7/2021 | Ranjan et al. |
| 2021/0209327 | A1 | 7/2021 | Wu et al. |
| 2021/0232791 | A1 | 7/2021 | Wang |
| 2021/0248350 | A1 | 8/2021 | Chang et al. |
| 2021/0264181 | A1 | 8/2021 | Park et al. |
| 2021/0271851 | A1 | 9/2021 | Chou et al. |
| 2021/0333928 | A1* | 10/2021 | Wu .................... G06V 40/1365 |
| 2021/0335325 | A1 | 10/2021 | Her et al. |
| 2021/0408140 | A1 | 12/2021 | Han et al. |
| 2022/0043488 | A1 | 2/2022 | Lombardi et al. |
| 2022/0050506 | A1 | 2/2022 | Gehlen et al. |
| 2022/0058254 | A1 | 2/2022 | Park et al. |
| 2022/0130308 | A1 | 4/2022 | Jung et al. |
| 2022/0148536 | A1 | 5/2022 | Choi |
| 2022/0165083 | A1 | 5/2022 | Lin et al. |
| 2023/0385393 | A1 | 11/2023 | Sammoura et al. |
| 2024/0062718 | A1 | 2/2024 | Karri et al. |

FOREIGN PATENT DOCUMENTS

| | | |
|---|---|---|
| CN | 111477135 | 7/2020 |
| CN | 112331145 | 2/2021 |
| CN | 113053306 | 6/2021 |
| CN | 114187867 | 3/2022 |
| KR | 20160080768 | 7/2016 |
| KR | 102279278 | 7/2021 |
| WO | 2022046025 | 3/2022 |
| WO | 2022105484 | 5/2022 |
| WO | 2023229653 | 11/2023 |

OTHER PUBLICATIONS

"Foreign Office Action", IN Application No. 202247031876, Aug. 7, 2023, 7 pages.

"Foreign Office Action", JP Application No. 2022-536640, Sep. 5, 2023, 4 pages.

"International Preliminary Report on Patentability", Application No. PCT/US2020/047670, Feb. 28, 2023, 10 pages.

"International Search Report and Written Opinion", Application No. PCT/US2022/072601, Jan. 16, 2023, 12 pages.

"International Search Report and Written Opinion", Application No. PCT/US2020/047670, May 12, 2021, 13 pages.

"Non-Final Office Action", U.S. Appl. No. 17/507,293, filed Feb. 17, 2023, 7 pages.

"Non-Final Office Action", U.S. Appl. No. 17/586,386, filed Oct. 24, 2022, 5 pages.

Choi, et al., "Disabling Transitions When Encoded Intensity is Low", Application No. PCT/US2021/070522, filed May 10, 2021, 46 pages.

Choi, et al., "Expediting Fingerprint Authentication by Compensating for Display Luminance Latency", Technical Disclosure Commons, https://www.tdcommons.org/dpubs_series/4686, Oct. 29, 2021, 11 pages.

Choi, et al., "Light-Guiding Structure For Under-Display Sensor Modules", Technical Disclosure Commons; Retrieved from https://www.tdcommons.org/dpubs_series/3527, Aug. 17, 2020, 8 pages.

Chugh, et al., "Fingerprint Spoof Detection: Temporal Analysis of Image Sequence", Dec. 17, 2019, 8 pages.

Ghiani, et al., "Fingerprint liveness detection using Binarized Statistical Image Features", Oct. 2013, 6 pages.

Karri, et al., "User Interface Mitigation of Display Artifacts During Transitions between Display Clock Speeds", Technical Disclosure Commons, https://www.tdcommons.org/dpubs_series/5427, Nov. 4, 2022, 7 pages.

Li-Fong, et al., "A Circular Flexible Amoled Display with a 1-mm Slim Border", May 25, 2016, pp. 847-850.

Lih, et al., "A True Circular 1.39 Inch Amoled for Wearable Application", May 2016, pp. 566-569.

Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.

Ojala, et al., "Multiresolution Gray-Scale and Rotation Invariant Texture Classification with Local Binary Patterns", Jul. 2002, pp. 971-987.

Sammoura, et al., "Fingerprint-Matching Algorithm Using Polar Shapelets", Technical Disclosure Commons; Retrieved from https://www.tdcommons.org/dpubs_series/2471, Sep. 10, 2019, 17 pages.

Sammoura, et al., "Safeguarding Biometric Authentication Systems from Fingerprint Spoof Attacks", Technical Disclosure Commons; Retrieved from https://www.tdcommons.org/dpubs_series/2769, Dec. 16, 2019, 13 pages.

Sammoura, et al., "Spoof Detection for Fingerprint Sensors", Technical Disclosure Commons; Retrieved from https://www.tdcommons.org/dpubs_series/2648, Nov. 5, 2019, 12 pages.

Shin, et al., "Dynamic Voltage Scaling of OLED Displays", Jun. 2011, 6 pages.

Skanda, "Xiaomi MI 9 to Feature an Improved In-screen Fingerprint Sensor", https://www.gizchina.com/2019/02/17/mi-9-fingerprint-improved-fingerprint/, Feb. 17, 2019, 10 pages.

Wen, et al., "Improving Under-Display Fingerprint Authentication Latency by Normalizing Frame Luminance", Technical Disclosure Commons—https://www.tdcommons.org/dpubs_series/5006, Mar. 24, 2022, 12 pages.

(56) References Cited

OTHER PUBLICATIONS

Yonebayashi, et al., "High refresh rate and low power consumption AMOLED panel using top-gate n-oxide and p-LTPS TFTs", Mar. 2020, 10 pages.
"Foreign Office Action", CN Application No. 202080085836.X, Mar. 15, 2024, 14 pages.

* cited by examiner

SPATIALLY AND TEMPORALLY DYNAMIC ILLUMINATION FOR FINGERPRINT AUTHENTICATION

CROSS-REFERENCE TO RELATED APPLICATIONS

This application claims priority to U.S. Provisional Application Ser. No. 63/500,114, filed May 4, 2023, the disclosure of which is incorporated by reference its entirety.

SUMMARY

This document describes systems and techniques for spatially and temporally dynamic illumination for fingerprint authentication. In aspects, a computer-implemented method is disclosed that involves receiving user input at a display of an electronic device and initiating, based on a determination of a locked state of one or more resources, biometric authentication. Responsive to initiating biometric authentication, the method further involves instructing a display-driver integrated circuit of the electronic device to implement a local high-brightness mode. The local high-brightness mode is configured to cause a predetermined portion of the display to increase in luminance to a target luminance for at least a first interval and a second interval. The luminosity of the predetermined portion of the display is lower for the first interval than the second interval due to a response delay. Further, the method involves instructing, based on a location of the user input, the display-driver integrated circuit to cause a variable portion of the display to increase in luminance for the first interval. The increase in luminance from the variable portion is sufficient to cause a total luminance from the predetermined portion and the variable portion to be approximately equal to or greater than the target luminance for the first interval. In addition, the method involves directing an under-display fingerprint sensor to capture one or more images of the user input at the display of the electronic device during at least the first interval. At the expiration of the first interval, the display-driver integrated circuit is instructed to cause the variable portion of the display to decrease in luminance and the predetermined portion of the display to illuminate at the target luminance. The method then involves analyzing the one or more images of the user input captured during the first interval and determining, based on the analysis of the one or more images, whether the user input is indicative of an authorized user.

This Summary is provided to introduce simplified concepts of systems and techniques directed spatially and temporally dynamic illumination for fingerprint authentication, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques for spatially and temporally dynamic illumination for fingerprint authentication are described in this document with reference to the following drawings:

FIG. 1-1 illustrates an example scenario of an electronic device performing biometric authentication;

FIG. 1-2 illustrates an example scenario in which a thumb of a user insufficiently contacts a display of an electronic device and a spatially-fixed, high-luminance region takes tens of milliseconds to achieve a target luminance;

FIG. 2-1 illustrates an example scenario of an electronic device performing biometric authentication using spatially and temporally dynamic illumination;

FIG. 2-2 illustrates spatially and temporally dynamic illumination for fingerprint authentication using an outer luminance region;

The same numbers are used throughout the Drawings to reference like features and components.

DETAILED DESCRIPTION

Overview

Many electronic devices (e.g., wireless-network devices, desktops, smartwatches) include an electronic visual display, often simply referred to as a display or screen, integrated as a portion of the electronic device's housing. Electronic device manufacturers fabricate these displays in a layered structure ("display panel stack"), containing a cover layer (e.g., cover glass) and a display module having a display panel.

Display panels increasingly rely on organic light-emitting diode (OLED) technology, which include tens of thousands of pixel circuits arrange in a two-dimensional array (e.g., circular array, rectangular array). Each pixel circuit may include one or more emitters, which, in isolation or combination, can illuminate to produce colored light ("pixel"). Through activation of the one or more emitters in these pixel circuits, electronic devices can cause a display panel to illuminate at various intensities and colors, effective to produce on-screen content (e.g., images). And, by exploiting a feature of the human eye and brain referred to as persistence of vision (e.g., retinal persistence), a display panel can redraw on-screen content at predetermined frequencies ("refresh rate"), giving the illusion of persistent on-screen content. For example, a display panel configured to operate at a 120 hertz (Hz) refresh rate can redraw on-screen content 120 times per second. Moreover, by redrawing on-screen content, the display panel can change on-screen content seamlessly (e.g., scrolling) and give an illusion of on-screen content as images in motion (e.g., video). The benefits of OLED displays include high refresh rates, small display response times, and low power consumption. These benefits make OLED displays well-suited for electronic devices, and are further appreciated by users, in large part, because of their display image-quality.

Further, electronic devices with OLED displays can be configured to include one or more under-display biometric recognition systems disposed underneath an OLED display. In more detail, some electronic devices are configured having one or more biometric recognition systems disposed underneath, or within, the display panel stack. For example, an under-display fingerprint sensor can be disposed beneath the cover layer and one or more layers (e.g., all layers, one layer) of the display module. Such an implementation allows for a high screen-to-body ratio and, further, preserves space on a display side of an electronic device. Users can then provide user input (e.g., a finger having a fingerprint, a fingertip touch input) at a display to authenticate themselves to one or more applications or an operating system implemented on the electronic device.

As an example, a UDFPS can be configured to capture images of a fingerprint ("verify images") at a predetermined frequency (e.g., frame rate) and a processor of the electronic device can then evaluate the verify images to determine authentication. In some implementations, authentication can involve comparing the verify images to one or more enrolled images (e.g., images of a fingerprint of a previously authenticated user) and/or a comparison of biometric identifiers. If the authentication is successful, then the user can gain access to a plurality of resources offered by one or more applications or an operating system of the electronic device. Users authenticating themselves to an electronic device using at least one biometric identifier, such as fingerprints, is referred to herein as biometric authentication.

Electronic devices configured to perform biometric authentication using a UDFPS may utilize pixels within one or more regions of the OLED display to illuminate user input (e.g., a finger). Due to a low transmissibility of light from an external environment through the display panel to the UDFPS, capturing well-illuminated user input can be difficult. For example, a display may have a visible light transmission (VLT) (e.g., the measurement of light transmission through a given medium) of less than 5%, resulting in sub-optimal image capturing of the user input on the part of the UDFPS. To facilitate image capturing, electronic devices may implement a localized high-luminance region in one or more regions of a display panel to better illuminate user input. Generally, this technique of localized high-luminance for biometric authentication at displays of electronic devices is referred to as local high-brightness mode (LHBM).

The luminosity of the high-luminance region, expressed in candela per square meter ("nit"), may be hundreds to thousands of nits greater in luminosity than other portions of the display panel ("background region") during biometric authentication. For example, an electronic device can implement a high-luminance region having a luminosity of 1300 or more nits and a background region (e.g., a non-high-luminance region) having a luminosity of 200 nits. Through such techniques, the electronic device may facilitate UDFPS sensing of reflected light from user input.

Display manufacturers often design display panels that implement LHBM in such a way that when a display driver integrated circuit (DDIC) receives an instruction from one or more processors of the electronic device to initiate LHBM, the DDIC causes the high-luminance region to increase in luminance to a preset (e.g., hardcoded) luminosity in a fixed location. For example, the location of the high-luminance region may be spatially-fixed on the display panel, corresponding (e.g., in a z-axis) to a fingerprint sensing region. In another example, the fingerprint sensing region is within a bottom portion of a display and the high-luminance region forms an ellipse and is localized to a fingerprint sensing region. Since the location, shape, and/or luminosity of the high-luminance region is predefined, one or more processors of the electronic device are often limited to simply turning on or off the high-luminance region by initiating LHBM. In other words, the one or more processors may be incapable of adjusting the preset location, shape, and/or luminosity level of the high-luminance region. As described herein, and for the aforementioned reasons, the localized high-luminance region may be referred to as a spatially-fixed, high-luminance region.

Figure 11:
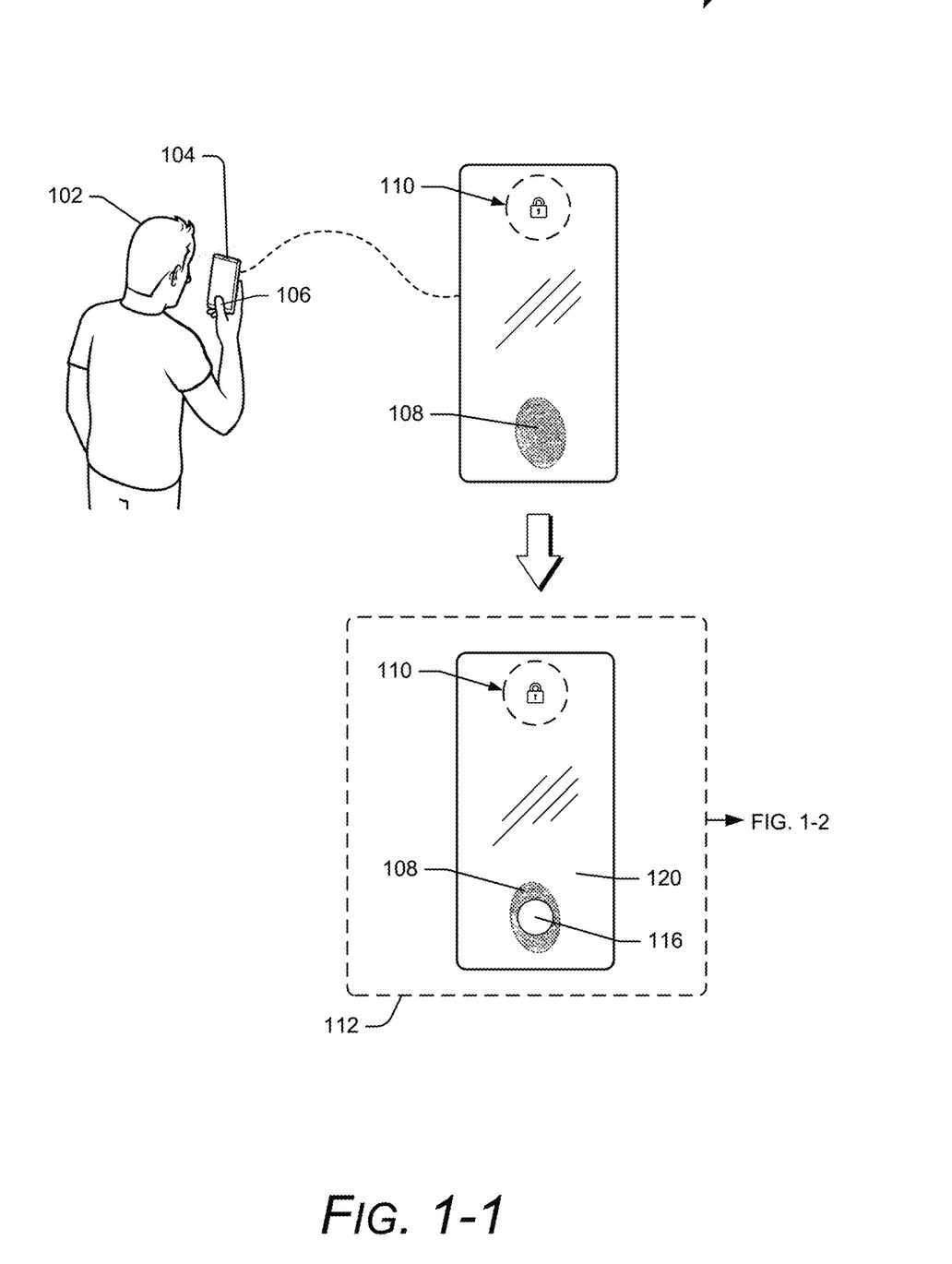

In many cases, if user input is sub-optimally illuminated, user authentication may be delayed. FIG. 1-1 illustrates an example scenario 100 of an electronic device performing biometric authentication. As illustrated, a user 102 is holding an electronic device 104. In order to gain access to resources on the electronic device 104, the user 102 may provide user input to a biometric authentication system (e.g., a fingerprint authentication system) of the electronic device 104. The user input can be provided at a display of the electronic device 104 by positioning a thumb 106 with a fingerprint 108, for example, on a lower portion of the display of the electronic device 104. Concurrent with, or in response to, the user 102 providing the user input at the display of the electronic device 104, one or more processors of the electronic device 104 may initiate biometric authentication 112.

During biometric authentication 112, one or more processors of the electronic device 104 instruct a DDIC to initiate LHBM, causing the display panel to implement a spatially-fixed, high-luminance region 116. The spatially-fixed, high-luminance region 116 can then illuminate the thumb 106 to capture a fingerprint 108 via a UDFPS.

However, at least two factors may delay biometric authentication 112, including insufficient contact between the thumb 106 and the display of the electronic device 104 and/or a response delay within pixel circuits of the spatially-fixed, high-luminance region 116. For example, during an initial stage of biometric authentication 112, a thumb 106 may be gradually pressed on a display and, as a result, portions of the thumb 106 may be insufficiently illuminated. In another example, during an initial stage of biometric authentication 112, pixel circuits of the spatially-fixed, high-luminance region 116 may experience a hysteresis effect at one or more thin-film transistors (TFTs), causing OLEDs to only gradually increase to a target luminance (e.g., 1300 nits) and resulting in an initial sub-optimal illumination of the user input.

Figure 12:
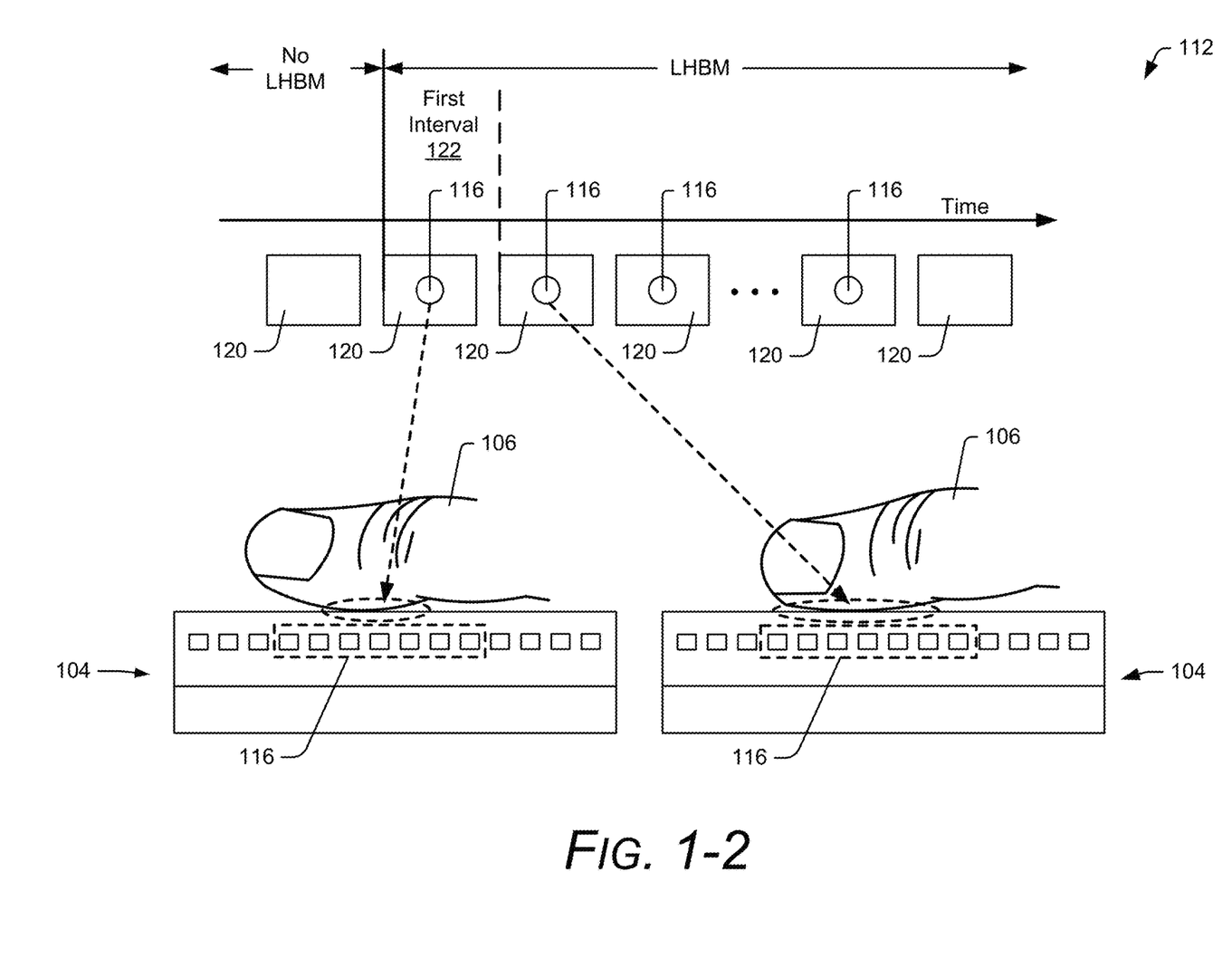

As illustrated in FIG. 1-2, for example, the thumb 106 of the user 102 insufficiently contacts the display of the electronic device 104 and the spatially-fixed, high-luminance region 116 takes tens of milliseconds to achieve the target luminance (e.g., the equivalent of a first interval 122). Both of these factors result in an inadequate illumination of the thumb 106 and, therefore, poor UDFPS sensing of the fingerprint 108 (e.g., UDFPS latency). As a result, authentication of the user input may be delayed until receipt of later frames, slowing user authentication. Biometric recognition services with slower user authentication speeds are often undesirable to users.

To remediate the illumination delay and UDFPS latency, some solutions involve overdriving the display panels. In one example, a driving current that causes an illumination of the OLEDs in the display panel within the spatially-fixed, high-luminance region 116 can be boosted (e.g., overdriving) to overcome the hysteresis effect. This driving current may be boosted for a duration sufficient to facilitate the capturing of a well-illuminated first frame and, thereby, reduce UDFPS latency. Such a solution, however, accelerates OLED material decay and can cause a burn-in of the high-luminance region in the display panel.

To minimize the degeneration of displays caused by overdriving and, thereby, prevent a reduced lifecycle, this document describes systems for spatially and temporally dynamic illumination for fingerprint authentication. The following discussion describes operating environments, techniques that may be employed in the operating environments, and example methods. Although techniques using and apparatuses for expediting fingerprint authentication via synchronization of dynamic display luminance and fingerprint capturing are described, it is to be understood that the subject of the appended claims is not necessarily limited to the specific features or methods described. Rather, the specific features and methods are disclosed as example implementations and reference is made to the operating environment by way of example only.

Example Device

Figure 21:
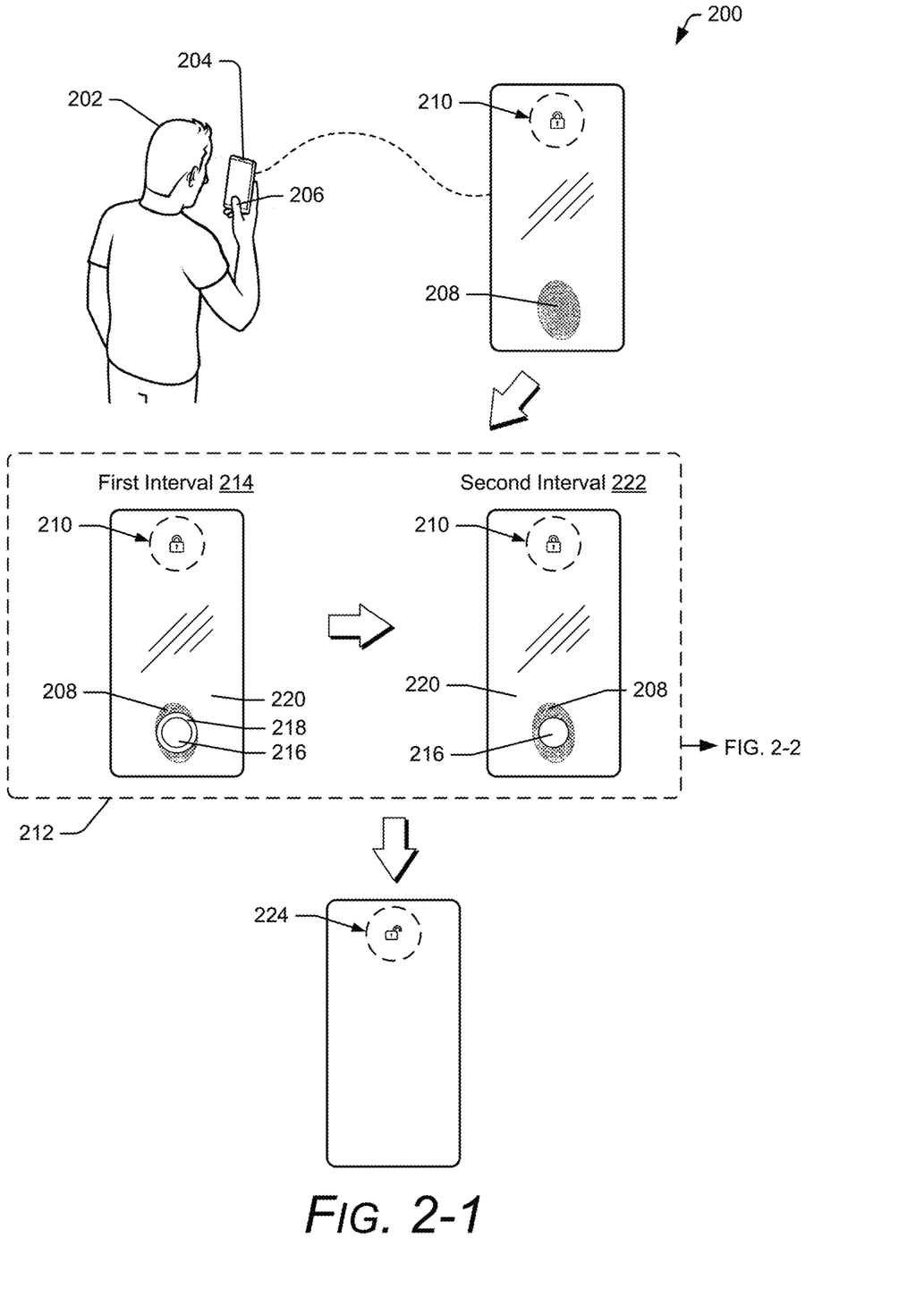

FIG. 2-1 illustrates an example scenario 200 of an electronic device performing biometric authentication with spatially and temporally dynamic illumination. As illustrated, a user 202 is holding an electronic device 204. In order to gain access to resources on the electronic device 204, the user 202 may provide user input to a biometric authentication system (e.g., a fingerprint authentication system) of the electronic device 204. The user input can be provided at a display of the electronic device 204 by positioning a thumb 206 with a fingerprint 208, for example, on a lower portion of the display of the electronic device 204. Concurrent with, or in response to, the user 202 providing the user input at the display of the electronic device 204, while the electronic device 204 is in a locked state 210, one or more processors of the electronic device 204 may initiate biometric authentication 212.

As illustrated, biometric authentication 212 can involve one or more processors transmitting driving signals, for a first interval 214, to the display (e.g., display panel) to increase: 1) a luminance of a spatially-fixed, high-luminance region 216 to a target luminance (e.g., 1300 nits); and 2) a luminance of an outer luminance region 218 that, at least partially, surrounds the spatially-fixed, high-luminance region 216. A background region 220 that surrounds the outer luminance region 218 may, based on the driving signals, maintain a current luminance level or increase in luminosity.

In one example, for the first interval 214, a spatially-fixed, high-luminance region 216 and an outer luminance region 218 increase in luminance while a background region 220 maintains a current luminance level. For a second interval 222, one or more processors transmit driving signals that: 1) continue to direct the spatially-fixed, high-luminance region 216 to illuminate at the target luminance; and 2) directs pixel circuits within the outer luminance region 218 to reduce their luminosity to be at the same luminosity as the background region 220.

Figure 22:
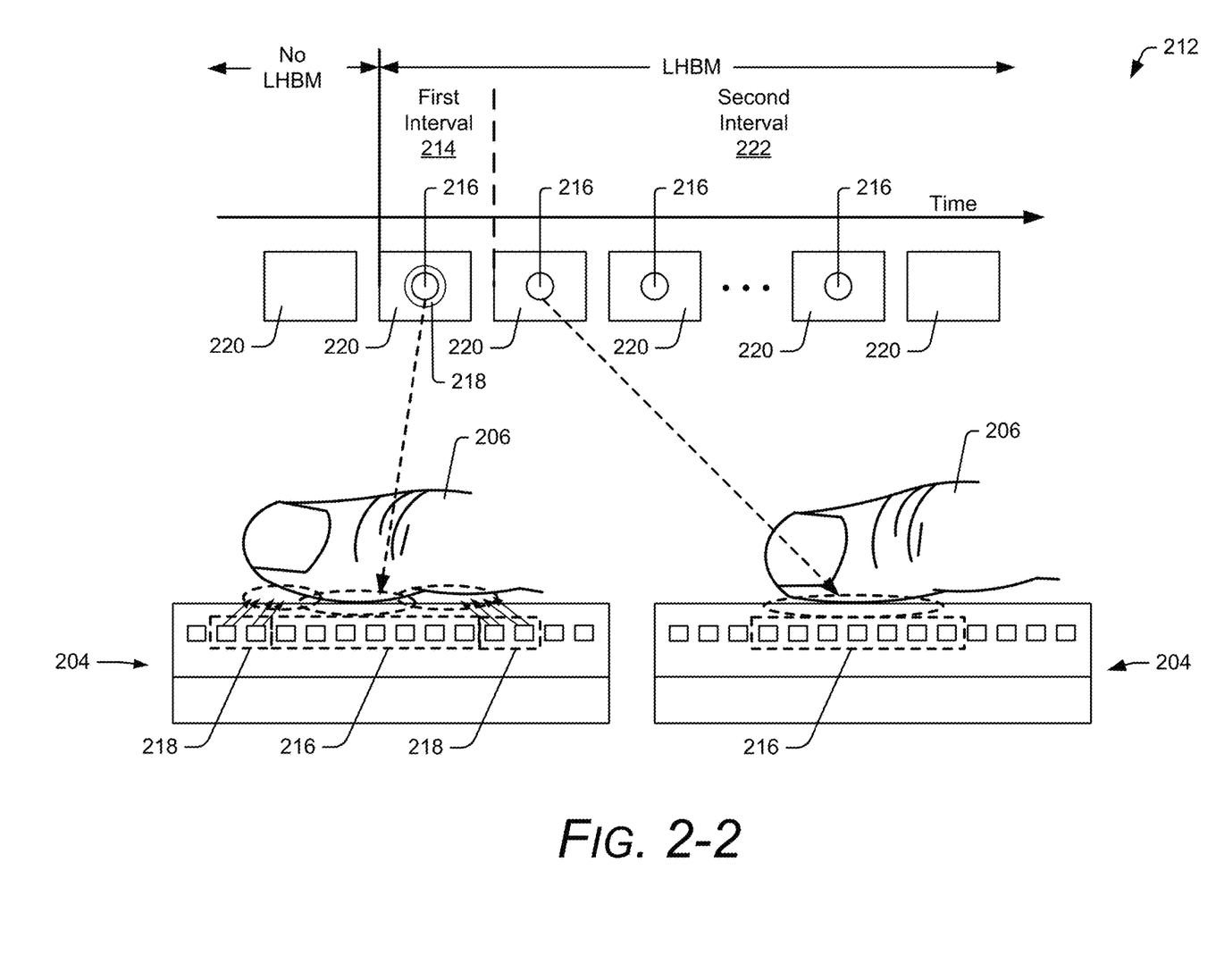

In more detail, consider FIG. 2-2, which illustrates spatially and temporally dynamic illumination for fingerprint authentication using the outer luminance region 218. Because the target luminance of the spatially-fixed, high-luminance region 216 may be hundreds of nits greater than an immediately preceding luminance, pixel circuits (e.g., pixel circuits having p-channel metal oxide semiconductor (PMOS) TFTs) within the local high-luminance region 216 may experience a response delay (e.g., from a hysteresis effect). As a result of the response delay, which causes OLEDs within the spatially-fixed, high-luminance region 216 to not achieve the target luminance within the first interval 214, one or more processors of the electronic device 204 can be configured to generate driving signals that cause OLEDs within the outer luminance region 218 to increase in luminosity. The additional illumination provided by the outer luminance region 218 may account for a difference between an actual luminance (e.g., a luminance that the spatially-fixed, high-luminance region 216 can achieve within the first interval 214) and the target luminance.

In this way, not only can the outer luminance region 218 provide additional illumination that enables the display to achieve a target illumination when the spatially-fixed, high-luminance region 216 is gradually increasing in luminosity, but it can also provide greater illumination for when the thumb 206 has insufficient contact with the display of the electronic device 204. For example, from the first interval 214 to any point in the second interval 222, the thumb 206 may be gradually pressed down on the display of the electronic device 204. Prior to the utilization of the outer luminance region 218, due to the gradual pressing down of the thumb 206 on the display, sub-optimal images of the fingerprint 208 may have been captured. However, with the supplemental illumination provided by the outer luminance region 218, despite the gradual pressing down of the thumb 206 on the display, more of the thumb 206 can be sufficiently illuminated to capture well-illuminated images of the fingerprint 208.

At the expiration of the first interval 214, the spatially-fixed, high-luminance region 216 may achieve the target luminance. As a result, driving signals can then direct pixel circuits within the outer luminance region 218 to reduce their luminosity (e.g., gradually, immediately) to be at the same luminosity as the background region 220.

Through such a technique, at an earlier point during biometric authentication 212, such as during the first interval 214, a UDFPS can capture one or more images ("verify images") of a well-illuminated fingerprint 208. Whereas, without the supplemental illumination provided by the outer luminance region 218, the UDFPS may be required to wait until the expiration of the first interval 214 for a better illuminated thumb 206. In other cases, the UDFPS could still capture verify images during the first interval 214, but the biometric authentication system may attempt analysis of the poorly-illuminated fingerprints 208, which could cause, for example, a bottlenecking in biometric authentication 212.

Once the UDFPS captures the verify images of the well-illuminated fingerprint 208, the biometric authentication system can then evaluate at least one of the verify images to determine if the fingerprint 208 is indicative of an authorized user. As illustrated in FIG. 2-1, if the biometric authentication system determines authenticity, the biometric authentication system can instruct, for example, an operating system of the electronic device 204 to change states from a locked state 210 to an unlocked state 224. If the biometric authentication system does not determine authenticity, the biometric authentication system can instruct the operating system to remain in the locked state 210 (not illustrated).

Figure 3:
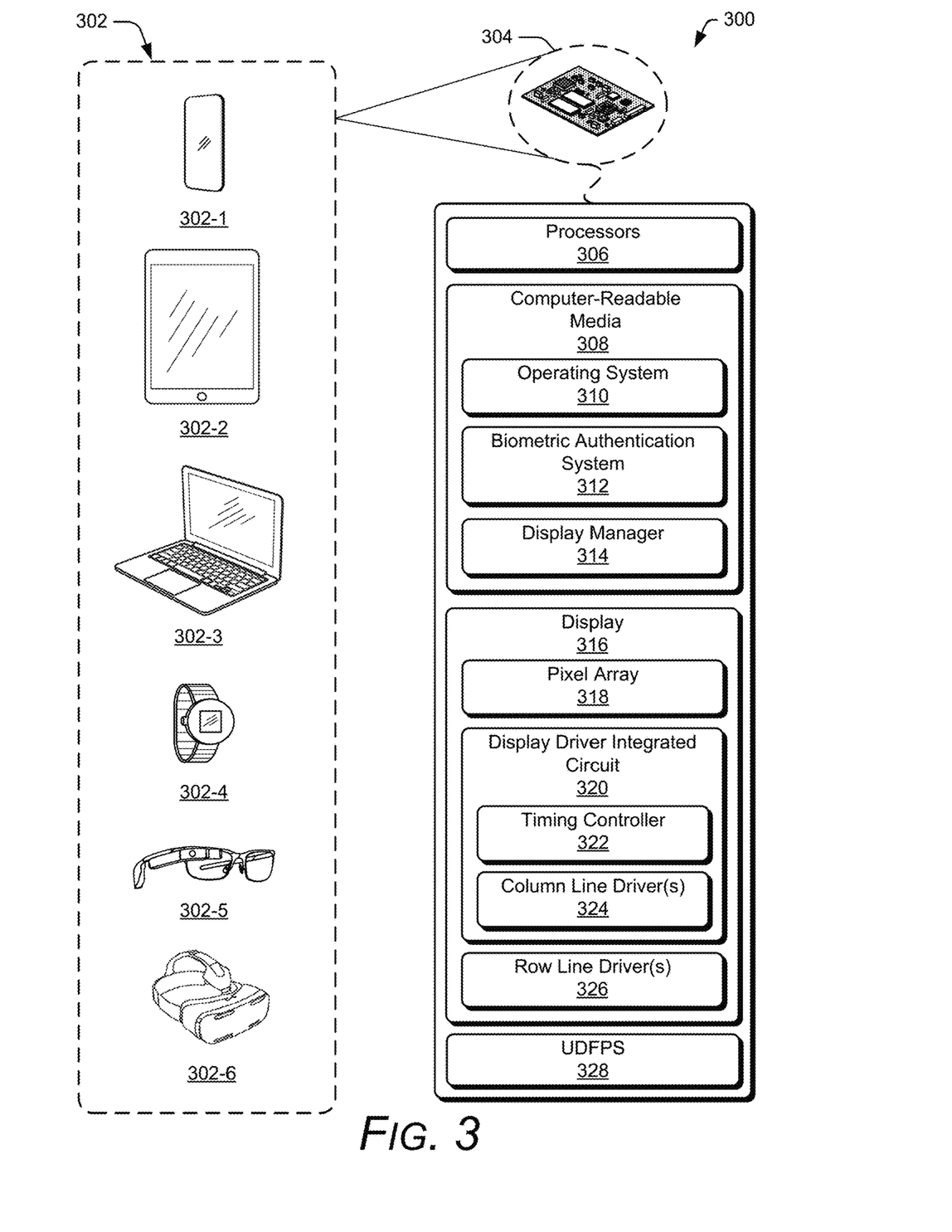
FIG. 3 illustrates an example implementation of example electronic devices that are capable of spatially and temporally dynamic illumination fingerprint authentication.

In more detail, FIG. 3 illustrates an example implementation 300 of example electronic devices which are capable of spatially and temporally dynamic illumination fingerprint authentication. The electronic devices 302 are illustrated as a variety of example devices, including consumer electronic devices. As non-limiting examples, the electronic device 302 can be a mobile phone 302-1 (e.g., electronic device 204), a tablet device 302-2, a laptop computer 302-3, a computerized watch 302-4, smart glasses 302-5, virtual-reality (VR) goggles 302-6, and the like. Note that the electronic device 302 can be wearable, non-wearable but mobile, or relatively immobile (e.g., desktops, appliances). The electronic device 302 may include additional components and interfaces omitted from FIG. 3 for the sake of clarity.

As illustrated, the electronic device 302 includes a printed circuit board assembly 304 (PCBA 304) on which components and interconnects of the electronic device 302 may be embodied. In implementations, the PCBA 304 may include multiple printed circuit boards operably coupled together via, for example, electrical wiring. Alternatively or additionally, components of the electronic device 302 can be embodied on other substrates, such as flexible circuit material or other insulative material. Generally, electrical components and electromechanical components of the electronic device 302 are assembled onto a printed circuit board (PCB) to form the PCBA 304. Various components of the PCBA 304 (e.g., processors and memories) are then programmed and tested to verify the correct function of the PCBA 304. The PCBA 304 is connected to or assembled with other parts of the electronic device 302 into a housing.

The PCBA 304 includes one or more processors 306 and computer-readable media 308. The processor(s) 306 may include any suitable single-core or multi-core processor. The processor(s) 306 may be configured to execute instructions or commands stored within computer-readable media 308 including an operating system 310, a biometric authentication system 312, a display manager 314, and/or applications (not illustrated). For example, the processor(s) 306 may perform specific computational tasks of the operating system 310 directed at controlling the creation and display of on-screen content on a display. In another example, the processor(s) 306 may execute instructions of the operating system 310 to implement a display refresh rate of 120 Hz. The computer-readable media 308 may include one or more non-transitory storage devices such as a random access memory (RAM), hard drive, solid-state drive (SSD), or any type of media suitable for storing electronic instructions, each coupled with a computer system bus. The term "coupled" may refer to two or more elements that are in direct contact (physically, electrically, magnetically, optically, etc.) or to two or more elements that are not in direct contact with each other, but still cooperate and/or interact with each other.

The electronic device 302 further includes a display 316. The electronic device 302 may include any of a variety of display technologies, such as an OLED display. The display 316 includes a pixel array 318 of pixel circuits and a display driver integrated circuit 320 (DDIC 320). The DDIC 320 may include a timing controller 322 and column line driver(s) 324. The column line driver(s) 324 may include, as a non-limiting example, a data-line driver. The display 316 may further include row line driver(s) 326. The row line driver(s) 326 may include, as non-limiting examples, gate-line drivers, scan-line drivers, and/or emission-control drivers.

The timing controller 322 provides interfacing functionality between the processor(s) 306 and the drivers (e.g., column line driver(s) 324, row line driver(s) 326) of the display 316. The timing controller 322 generally accepts commands and data from the processor(s) 306, generates signals with appropriate voltage, current, timing, and demultiplexing, and transmits the signals to the drivers to enable the display 316 to present the desired image.

The drivers may transmit time-variant and amplitude-variant signals (e.g., voltage signals, current signals) to control the pixel array 318. For example, a data-line driver transmits signals containing voltage data to the pixel array 318 to control the luminance of an organic light-emitting diode. A scan-line driver transmits a signal to enable or disable an organic light-emitting diode to receive the data voltage from the data-line driver. An emission-control driver supplies an emission-control signal to the pixel array 318. Together, the drivers control the pixel array 318 to generate light to create an image on the display 316.

The PCBA 304 may further include one or more sensors disposed anywhere on or in the electronic device 302. The sensors can include any of a variety of sensors, such as an audio sensor (e.g., a microphone), a touch-input sensor (e.g., a touchscreen), an image-capture device (e.g., a camera, video-camera), proximity sensors (e.g., capacitive sensors), an ambient light sensor (e.g., photodetector), and/or an UDFPS 328. The UDFPS 328 can be implemented as an optical UDFPS or as an ultrasonic UDFPS. The UDFPS 328 can be disposed within a housing of the electronic device 302, embedded underneath the display 316. In implementations, the PCBA 304 can include more than one UDFPS 328.

Figure 4:
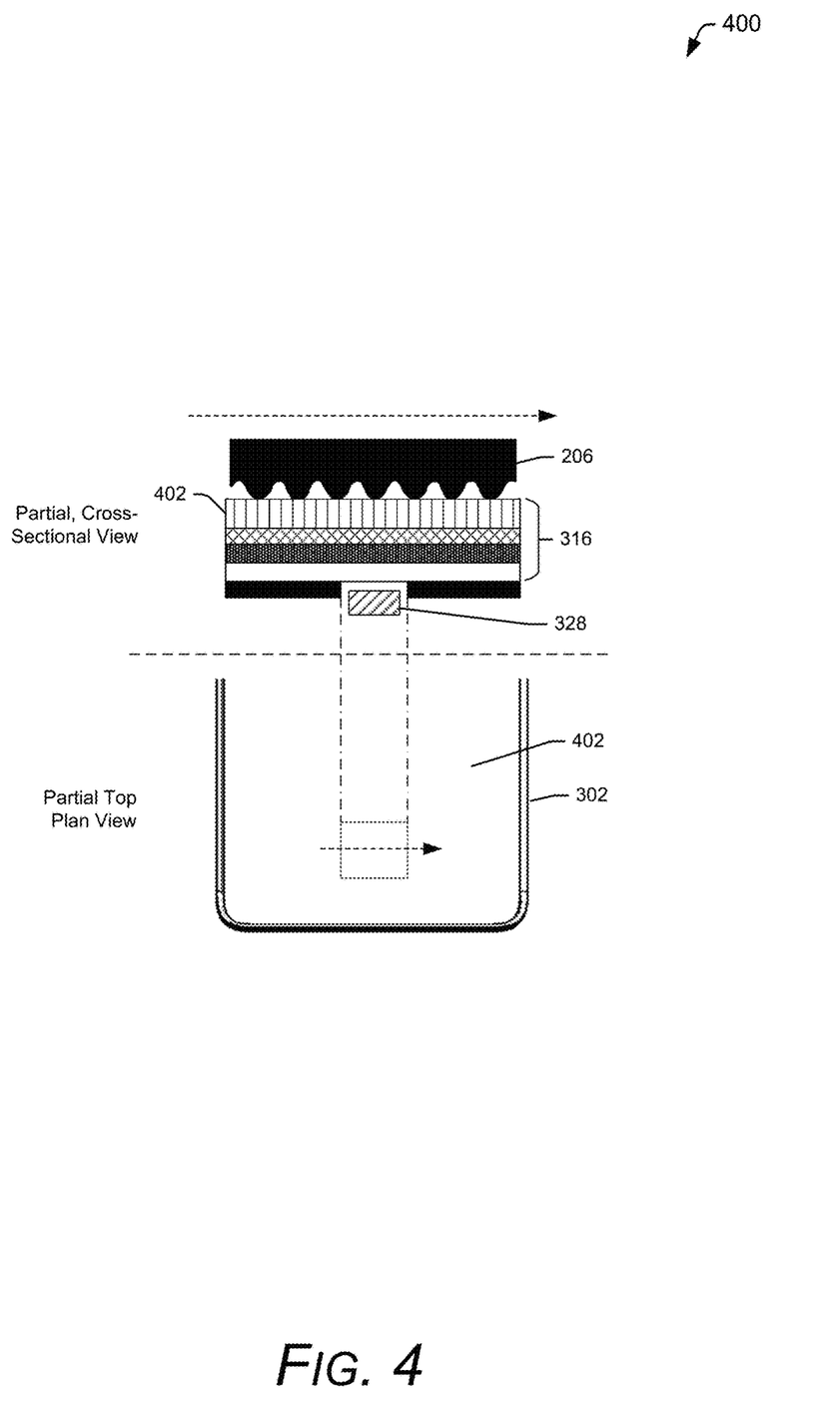
FIG. 4 illustrates a partial top plan view and a partial, cross-sectional view of an electronic device having an under-display fingerprint sensor.

FIG. 4 illustrates a partial top plan view and a partial, cross-sectional view of the electronic device 302 having the UDFPS 328. In portions of the following discussion, reference may be made to example implementation 300 of FIG. 3 and entities detailed in FIGS. 2-1 and 2-2 for example only. As illustrated in the partial top plan view, at a bottom half of the electronic device 302, a UDFPS 328 may be embedded underneath the display 316. The display 316 may be implemented as a display panel stack including a cover layer 402 and a display module. In implementations, the cover layer 402 may be any transparent substrate composed of a variety of materials, including plastic or glass. The display module may include one or more of a polarizer film, a display panel, a metallic layer, optical adhesive (OCA), a polymer layer, and a back cover. In one implementation, the UDFPS 328 is attached (e.g., bonded, laminated) to the underside of the display 316. Although the UDFPS 328 and the corresponding sensing region is illustrated as shaped substantially rectangular, the UDFPS 328 and the corresponding sensing region can form any of a variety of shapes.

During biometric authentication (e.g., biometric authentication 212), the display manager 314 may instruct processor(s) 306 to implement LHBM such that the UDFPS 328 can capture well-illuminated verify images. In implementations, the outer luminance region (e.g., outer luminance region 218) can partially or fully encompass the spatially-fixed, high-luminance region (e.g., spatially-fixed, high-luminance region 216). The outer luminance region can also comprise any of a variety of two-dimensional shapes, including rectangles, ovals, or irregular shapes. In some implementations, display manager 314 can position the outer luminance region on the display 316 based on a location of user input at the display 316. For example, the display 316 can receive user input using a touch-sensitive layer (e.g., thumb 206 on the cover layer 402) and the display manager 314 can then determine a location, size, and/or centroid of the user input. Based on the determination, the display manager 314 can then instruct the processor(s) 306 to provide driving signals to the DDIC 320 to produce an outer luminance region. In another example, the electronic device 302 can use proximity sensors, image-capturing sensors, touch-sensitive sensors, and/or radar sensors to determine a location of a thumb before and/or during contact with the display 316. The display manager 314 can then instruct the processor(s) 306 to provide driving signals to the DDIC 320 to produce an outer luminance region that is located on the display 316 based on the location of the thumb. In further implementations, the display manager 314 can dynamically control the outer luminance region to produce uniform or non-uniform (e.g., patterned, gradient)

illumination. In one example, the display manager 314 can instruct the DDIC 320 to produce an outer luminance region with a blurring effect.

Figure 5:
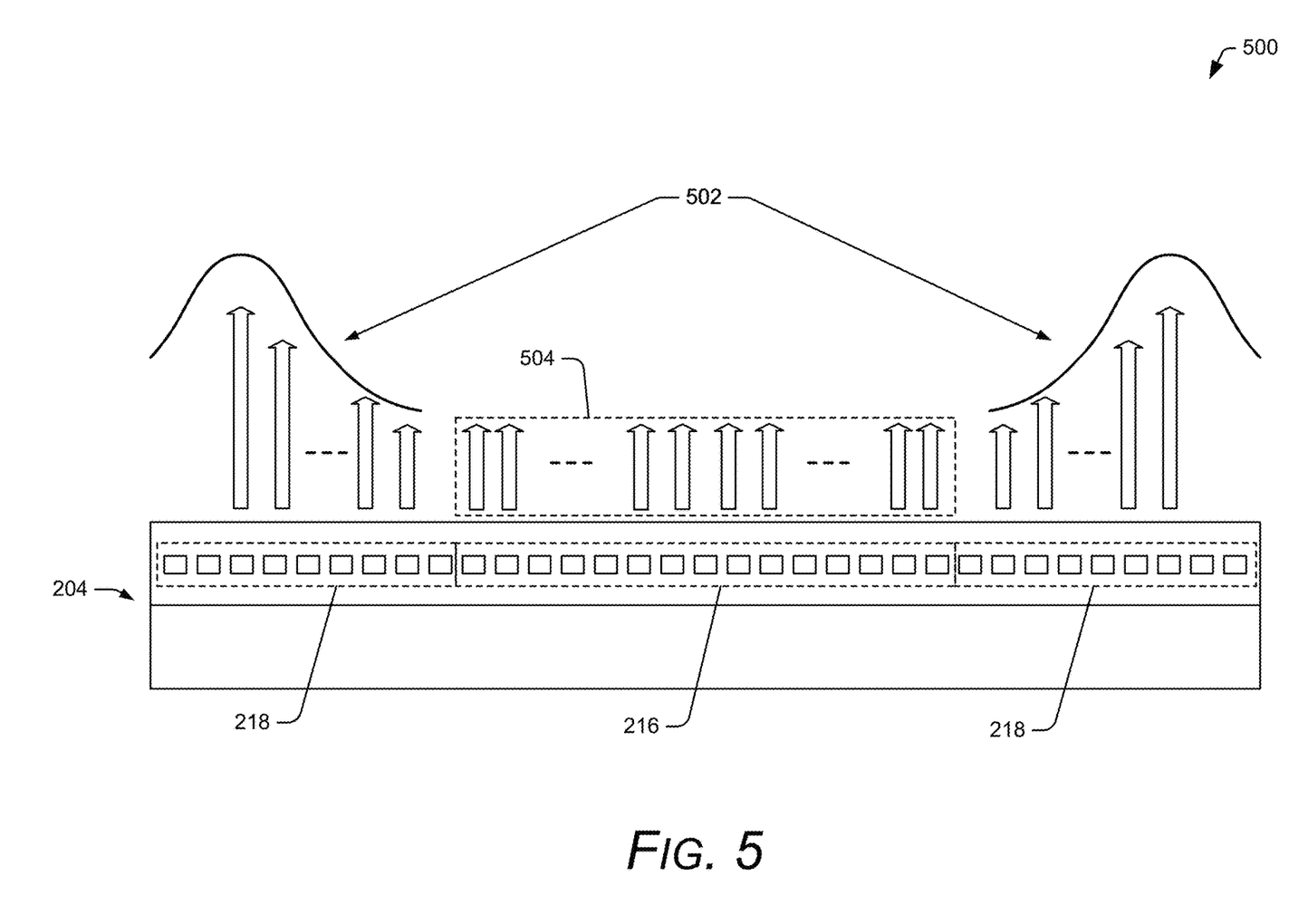
FIG. 5 illustrates an example implementation of an outer luminance region with a gaussian blurring effect.

FIG. 5 illustrates an example implementation 500 of an outer luminance region with a gaussian blurring effect. As illustrated, a luminosity 502 of the outer luminance region 218 is non-uniform. In one example, for the first interval 214, the brightness of pixels closer to the spatially-fixed, high-luminance region 216 are approximately similar to a brightness of pixels within the spatially-fixed, high-luminance region 216 than are pixels further away from the spatially-fixed, high-luminance region 216. Pixels that are further away (e.g., radially) from the spatially-fixed, high-luminance region 216 may achieve higher luminance levels than pixels within the spatially-fixed, high-luminance region 216 during the first interval 214 through pulse-width modulation and/or pulse-amplitude modulation.

In more detail, when processor(s) 306 direct the DDIC 320 to implement LHBM, the DDIC 320 may instruct drivers (e.g., emission-control drivers) to transmit signals (e.g., emission-control signals) to pixels within the spatially-fixed, high-luminance region 216 to illuminate at a target luminosity. During the first interval 214, pixels within the spatially-fixed, high-luminance region 216 may only illuminate at luminosity 504, which is lower than the target luminosity. Luminosity 504 is the result of one or more emission cycles having a particular duty cycle and amplitude, which may be determined by a preset setting (e.g., hardcoded, pre-coded) within the DDIC 320. While in LHBM, the processor(s) 306 may not be capable of altering the particular duty cycle and amplitude of the one or more emission cycles of the spatially-fixed, high-luminance region 216. However, the display manager 314, executing on the processor(s) 306, may be capable of altering a duty cycle and an amplitude of one or more emission cycles of the outer luminance region 218. As an example, the processor(s) 306 can direct the DDIC 320 to alter one or more emission cycles of pixels within the outer luminance region 218 through at least one of pulse-width modulation or pulse-amplitude modulation, resulting in greater luminance levels during the first interval 214.

Figure 6:
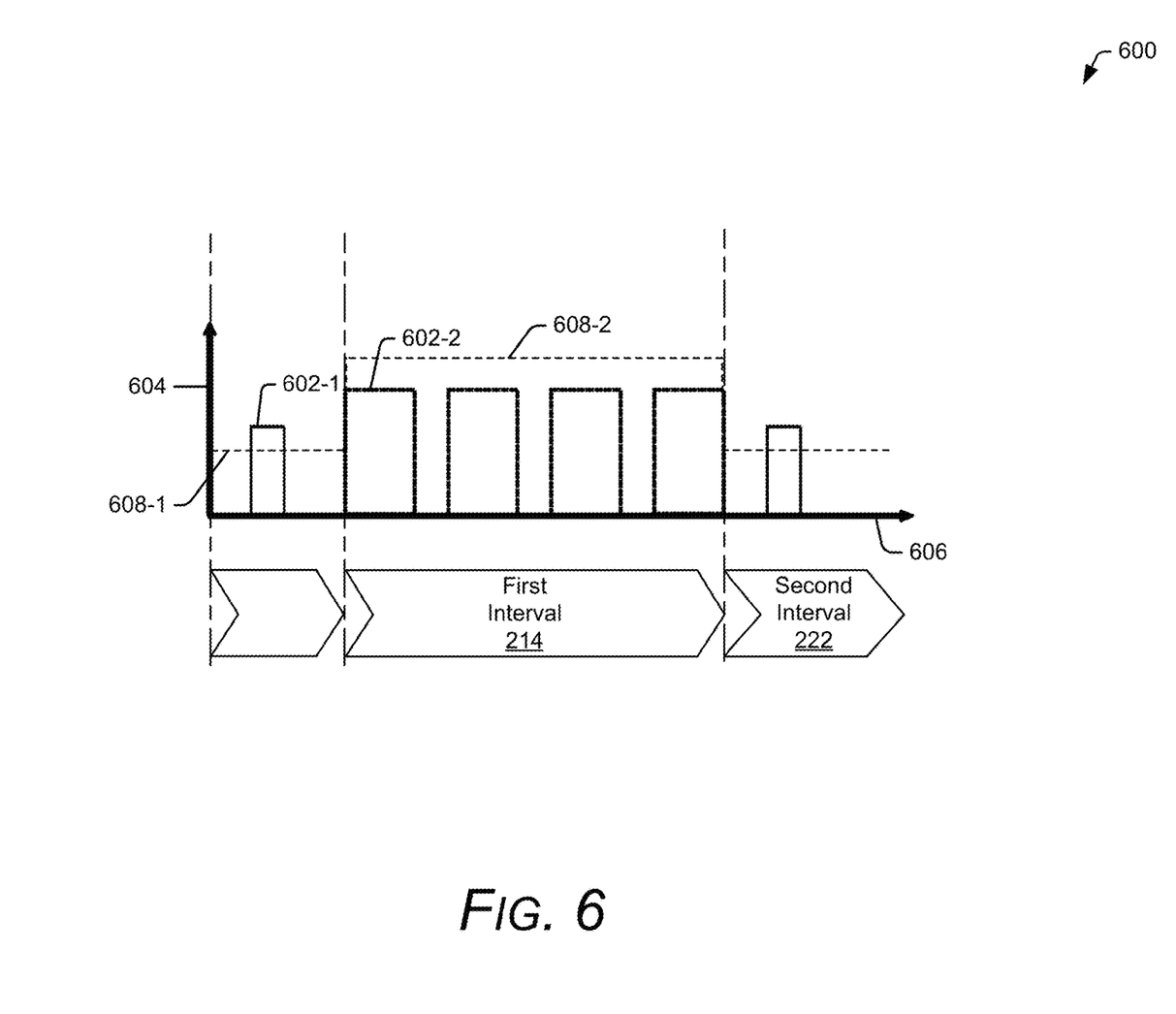
FIG. 6 illustrates an example graph demonstrating multiple example emission cycles for any of number of pixels within an outer luminance region.

Consider FIG. 6, which illustrates an example graph 600 that includes multiple example emission cycles 602 (e.g., emission cycle 602-1, emission cycle 602-2) for any of the pixels within the outer luminance region 218. The example graph 600 illustrates pixel luminance (e.g., y-axis 604) versus time (e.g., x-axis 606). In implementations, the display manager 314 directs the DDIC 320 to implement a pixel luminance (e.g., a perceived pixel luminance) using one or more emission cycles 602. As an example, the display manager 314 directs the DDIC 320 to implement a pixel luminance of 80 nits (e.g., perceived pixel luminance 608-1) using a first emission cycle waveform 602-1, which has a duty cycle of 40%. The first emission cycle 602-1 may be an emission cycle before biometric authentication, for example. During biometric authentication and for the first interval 214, the display manager 314 may direct the DDIC 320 to produce, at any of the pixels within the outer luminance region 218, a second emission cycle 602-2 with a duty cycle of 80% and an increased amplitude using pulse-width modulation and pulse-amplitude modulation, respectively. As an example (not illustrated), during biometric authentication, the DDIC 320 may be preset to produce, at pixels within the spatially-fixed, high-luminance region 216, emission cycles with a duty cycle of 80% but an amplitude equal to emission cycle 602-1. By enabling the display manager 314 to alter emission cycles within the outer luminance region 218 using at least one of pulse-width modulation or pulse-amplitude modulation, the display manager 314 can cause the outer luminance region 218 to achieve a greater luminosity during the first interval 214 than the spatially-fixed, high-luminance region 216.

Returning back to FIG. 5, as a result of the gaussian blurring effect at the outer luminance region 218, a thumb (e.g., thumb 206) may be more sufficiently illuminated. In one example, due to a curvature of a thumb, portions of the thumb may be sub-optimally illuminated, especially as the thumb is gradually pressed down on a display. Using the gaussian blurring effect, those portions of the thumb that may otherwise receive less incident light (e.g., due to thumb curvature) can be better illuminated. Furthermore, such a gaussian blurring effect, particularly at the transition point from the spatially-fixed, high-luminance region 216 to the outer luminance region 218, may be more aesthetically-pleasing to users because of a smooth luminance transition.

Further to the above descriptions, using an outer luminance region (e.g., outer luminance region 218) to supplement a spatially-fixed, high-luminance region (spatially-fixed, high-luminance region 216) during biometric authentication can provide power-saving benefits. For instance, using the outer luminance region, a biometric authentication system may be spared from analyzing sub-optimally illuminated fingerprint images, minimizing processing time and LHBM time. In addition, a driving current to the spatially-fixed, high-luminance region need not be increased. As a result, the outer luminance region can improve a display panel lifetime and reduce burn-in degradation.

Figure 7:
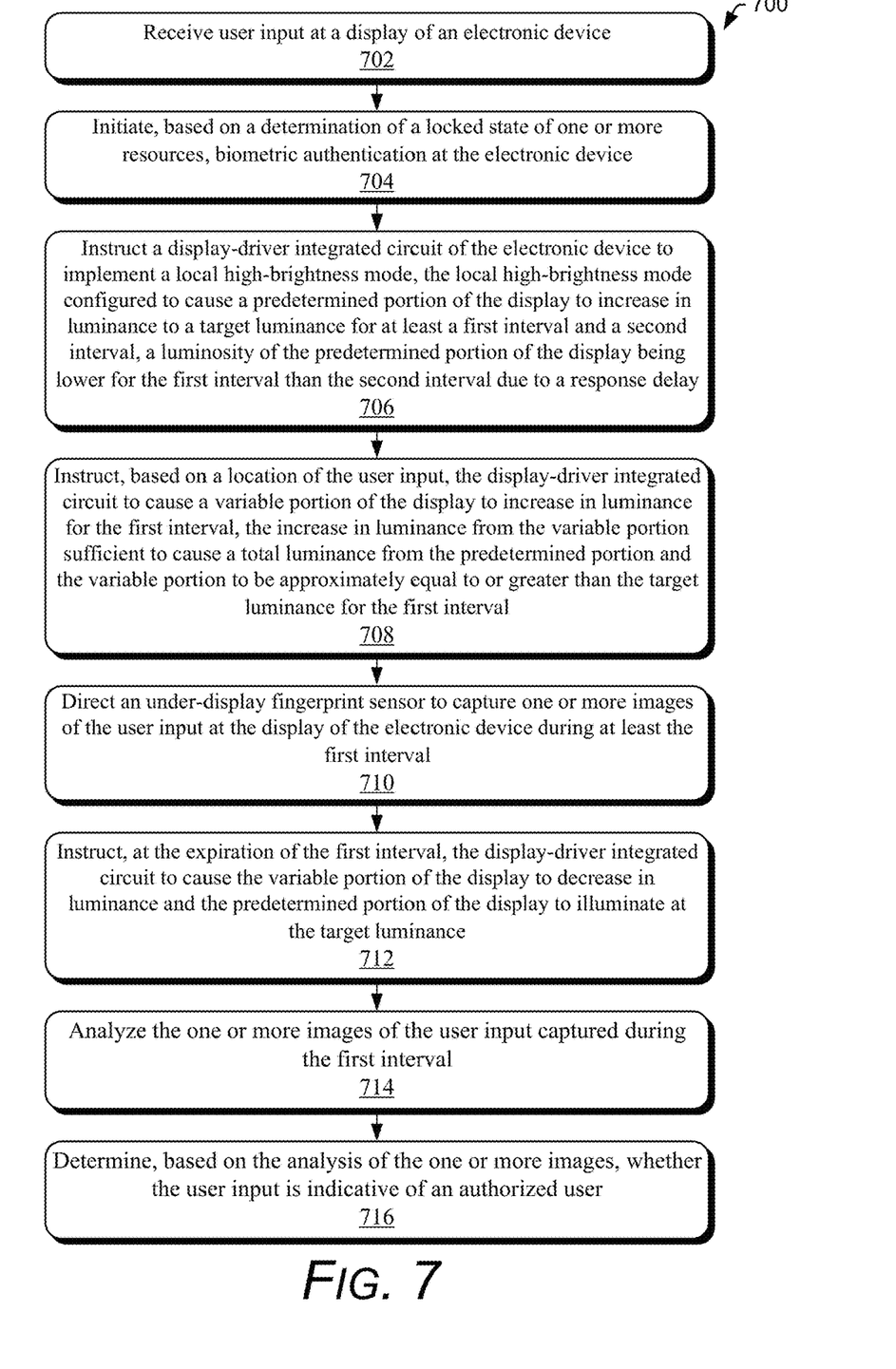
FIG. 7 illustrates an example method of an electronic device configured for spatially and temporally dynamic illumination for fingerprint authentication.

FIG. 7 illustrates an example method 700 of an electronic device (e.g., electronic device 302) configured for spatially and temporally dynamic illumination for fingerprint authentication. At block 702, the electronic device receives user input at a display (e.g., a touch-sensitive display). At block 704, the electronic device (e.g., processor(s) 306) initiates biometric authentication based on a determination of one or more resources being locked on the electronic device.

At block 706, processors in the electronic device instruct a display-driver integrated circuit to implement a local high-brightness mode. The local high-brightness mode is configured to cause a predetermined portion (e.g., spatially-fixed, high-luminance region 216) of the display to increase in luminance to a target luminance for at least a first interval (e.g., first interval 214) and a second interval (e.g., second interval 222). The luminosity of the predetermined portion of the display is lower for the first interval than the second interval due to a response delay (e.g., a hysteresis effect at pixel circuits of the display).

At block 708, processors in the electronic device instruct the display-driver integrated circuit to cause a variable portion (e.g., outer luminance region 218) of the display to increase in luminance for the first interval based on the location of the user input. The increase in luminance from the variable portion is sufficient to cause a total luminance from the predetermined portion and the variable portion to be approximately equal to or greater than the target luminance for the first interval.

At block 710, the processors in the electronic device direct a UDFPS (e.g., UDFPS 328) to capture one or more images of the user input at the display of the electronic device during at least the first interval.

At block 712, the processors in the electronic device instruct, at the expiration of the first interval, the display-driver integrated circuit to cause the variable portion of the display to decrease in luminance and the predetermined portion of the display to illuminate at the target luminance.

At block 714, the processors analyze the one or more images of the user input captured during the first interval.

At block 716, the processors determine, based on analysis of the one or more images, whether the user input is indicative of an authorized user.

What is claimed is:

1. A computer-implemented method comprising:
   receiving user input at a display of an electronic device;
   initiating biometric authentication at the electronic device;
   responsive to initiating biometric authentication:
   instructing a display-driver integrated circuit of the electronic device to implement a local high-brightness mode, the local high-brightness mode configured to cause a predetermined portion of the display to increase in luminance to a target luminance for at least a first interval and a second interval, a luminosity of the predetermined portion of the display being lower for the first interval than the second interval due to a response delay;
   instructing, based on a location of the user input, the display-driver integrated circuit to cause a variable portion of the display to increase in luminance for the first interval, the increase in luminance from the variable portion sufficient to cause a total luminance from the predetermined portion and the variable portion to be approximately equal to or greater than the target luminance for the first interval;
   directing an under-display fingerprint sensor to capture one or more images of the user input at the display of the electronic device during at least the first interval;
   instructing, at the expiration of the first interval, the display-driver integrated circuit to cause the variable portion of the display to decrease in luminance and the predetermined portion of the display to illuminate at the target luminance;
   analyzing the one or more images of the user input captured during the first interval; and
   determining, based on the analysis of the one or more images, whether the user input is indicative of an authorized user.

2. The computer-implemented method of claim 1, wherein initiating biometric authentication is further based on a location of the user input at the display of the electronic device.

3. The computer-implemented method of claim 1, further comprising:
   determining, prior to or concurrent with receiving user input at the display, a location of the user input, the location of the user input determined based on at least one of a proximity sensor, a radar sensor, touch-sensitive sensor, or an image-capturing sensor.

4. The computer-implemented method of claim 1, wherein initiating biometric authentication is based on a determination of a locked state of one or more resources.

5. The computer-implemented method of claim 4, further comprising, responsive to determining whether the user input is indicative of the authorized user, changing the locked state of the one or more resources to an unlocked state.

6. The computer-implemented method of claim 1, wherein the instruction to the display-driver integrated circuit further causes the variable portion of the display to implement a gaussian blurring effect.

7. The computer-implemented method of claim 1, further comprising:
   performing at least one of pulse-width modulation or pulse-amplitude modulation on an emission cycle of pixels within the variable portion during the first interval.

8. The computer-implemented method of claim 1, further comprising:
   directing the under-display fingerprint sensor to capture additional images of the user input during the second interval.

9. The computer-implemented method of claim 1, further comprising:
   instructing, responsive the determination of whether the user input is indicative of the authorized user, the display-driver integrated circuit of the electronic device to cause the predetermined portion of the display to decrease in luminance to equal a luminance of the variable portion.

10. The computer-implemented method of claim 1, wherein:
    the variable portion comprises any of a variety of two-dimensional shapes; and
    the variable portion at least partially surrounds the predetermined portion.

* * * * *